United States Patent [19]

Stuart, Jr. et al.

[11] Patent Number: 4,719,260
[45] Date of Patent: Jan. 12, 1988

[54] HOT-MELT ADHESIVE COMPOSITIONS

[75] Inventors: Richard K. Stuart, Jr.; Bruce W. Foster, both of Longview, Tex.

[73] Assignee: Eastman Kodak Company, Rochester, N.Y.

[21] Appl. No.: 12,471

[22] Filed: Feb. 9, 1987

[51] Int. Cl.$^4$ .................. C08L 51/06; C08L 23/14; C08L 23/16; C08L 23/10
[52] U.S. Cl. .................... 525/74; 525/285; 525/411
[58] Field of Search .................... 525/285, 74, 416

[56] References Cited

U.S. PATENT DOCUMENTS

| | | | |
|---|---|---|---|
| 2,208,321 | 7/1940 | Bradley | 525/285 |
| 2,608,550 | 8/1952 | Rowland et al. | 525/285 |
| 3,240,762 | 3/1966 | Wilks et al. | 525/285 |
| 3,437,629 | 4/1969 | Von Bramer et al. | 524/569 |
| 3,700,768 | 10/1972 | Johnson et al. | 525/416 |
| 3,701,760 | 10/1972 | Hagemeyer et al. | 525/338 |
| 3,984,381 | 10/1976 | Tsucheya et al. | 525/285 |
| 4,086,198 | 4/1978 | Mitsui et al. | 525/285 |
| 4,217,428 | 8/1980 | McConnell | 525/191 |
| 4,358,564 | 11/1982 | Ames | 525/261 |
| 4,533,700 | 8/1985 | Mitsui et al. | 525/285 |
| 4,670,504 | 6/1987 | Cardenas et al. | 525/285 |

*Primary Examiner*—Carman J. Seccuro
*Attorney, Agent, or Firm*—John F. Stevens; William P. Heath, Jr.

[57] ABSTRACT

Disclosed is a hot-melt adhesive composition comprising from about 55 to about 95 weight % of an amorphous polymer containing at least 30% propylene and from about 45 to about 5 weight % of a graft copolymer of
 (a) a saturated, polycyclic hydrocarbon resin, and
 (b) maleic anhydride.

5 Claims, No Drawings

HOT-MELT ADHESIVE COMPOSITIONS

TECHNICAL FIELD

This invention relates to hot-melt adhesive compositions comprising amorphous polyolefins and graft copolymers of polycyclic aliphatic hydrocarbon resins and maleic anhydride. Such compositions have excellent adhesion, especially to difficult-to-bond substrates such as polyethylene, and are useful in the assembly of disposable diapers, sanitary napkins, bed pads, and other assembly applications where polyethylene film is bonded.

The hot-melt adhesives to which this invention relates are prepared from a base polymer or copolymer of propylene and a polycyclic hydrocarbon resin. In the past, it has been proposed to functionalize the base polymer in an effort to improve adhesion. Graft copolymers have been formed using the monomer from which the base polymer is formed and maleic anhydride, thus typically forming a maleated polyethylene or maleated polypropylene. During the grafting reaction, however, the viscosity of the base polymer either increased because of cross-linking as in the case of polyethylene or decreased greatly because of polymer degradation as in the case of polypropylene. It has now been found that improved adhesion can be obtained by grafting the polycyclic hydrocarbon rather than the base polymer resin with maleic anhydride. In this manner, problems with viscosity control are avoided.

Also, the improved adhesion, in turn, results in less zippering (also known as "slip-stick"), which is often noticed when bonded substrates are separated, resulting from areas of poor adhesion alternating with areas of good adhesion.

Graft polymerization of maleic anhydride onto polyethylene and polyethylene copolymers is described in U.S. Pat. No. 4,358,564. In all examples the viscosity of the grafted polymer is considerably greater than the starting viscosity. Even with the use of viscosity stabilizers the viscosity of the grafted polyethylene increases greatly. The graft polymerizations of maleic anhydride onto amorphous or crystalline polypropylene results in a product with greatly reduced viscosity.

Copending application, Ser. No. 012469, filed on even date by joint applicant Stuart herein, relates to graft copolymers of polycyclic, saturated hydrocarbon resins which are useful in preparing the hot-melt adhesives of this invention.

DISCLOSURE OF THE INVENTION

According to the present invention, there are provided hot-melt adhesive compositions having improved peel strength comprising a mixture of
(a) from about 55 to about 95 weight % of an amorphous polymer containing at least 30% propylene, and
(b) from about 45 to about 5 weight % of a graft copolymer of
  (1) a polycyclic, saturated, aliphatic hydrocarbon resin having a viscosity of 100–2000 cps at 190° C. and a ring and ball softening point (RBSP) of 75°–150° C., and
  (2) maleic anhydride, the graft copolymer having an acid number of about 0.5–60.

The amorphous polymer described above may contain up to 70% of one or more α-olefins other than propylene having 2–6 carbon atoms.

Also according to the present invention, there are provided plasticized compositions as described above, and articles, especially polyethylene film, bonded with the compositions described above.

The present invention further provides compositions of matter such as adhesives comprising the graft copolymers described above.

The amorphous polymer may contain up to 70% of at least one other α-olefin having 2–6 carbon atoms such as ethylene, butene, hexene, etc.

Preferably, the graft copolymers according to this invention have acid numbers of about 1.0–42. Preferably, the polycyclic hydrocarbon resin has a viscosity of about 150–1000 cps at 190° C., an acid number of about 2.0–6.0, a ring and ball softening point of about 100°–130° C., a density of about 1.0–1.1, and a flash point of about 230°–310° C. Typically, this resin has a number average value of 60 carbon atoms and a weight average of 113 carbon atoms.

By the term "saturated" it is meant that the polycyclic hydrocarbon resins are substantially saturated. The resins may contain an insignificant number of unsaturated bonds and still be within this definition. Typically, the useful polycyclic hydrocarbon resins have bromine numbers of less than 6.

As examples of polycyclic, saturated, hydrocarbon polymeric resin used in the compositions of the present invention, Eastotac H-100, H-115 and H-130, processed from C5 feed streams, are typical. Other suitable commercially available polycyclic, saturated, hydrocarbon resins include Escorez 520 Resin which is a C5 resin, Zonarex B-125 Resin (a beta terpene resin) and Wingtac 95 Resin, a C5 resin. Other saturated, polycyclic hydrocarbon resins having the description called for above may also be used.

The Eastotac resins as well as other polycyclic, saturated, hydrocarbon resins may be prepared by techniques well known to those skilled in the art. For example, U.S. Pat. No. 3,701,760 incorporated herein by reference, discloses a process suitable for forming certain polycyclic, saturated hydrocarbon resins suitable for producing the graft copolymers in accordance with this invention.

In general terms, the process disclosed in the U.S. Pat. No. 3,701,760 for preparing these polycyclic hydrocarbon resins is as follows: polymerizing a mixed hydrocarbon fraction in the presence of AlCl$_3$ in a two-stage reaction system wherein the temperature in the first stage is lower than that in the second stage to obtain a solution containing a high softening point crude resin in good yields, removing the chlorides from the resin solution by methanol extraction or high temperature lime treatment followed by low pressure hydrogenation and/or alumina treatment followed by high pressure-high temperature hydrogenation to remove color and reduce unsaturation and thereafter stripping the resin solution to obtain a low color, color stable, high softening point hydrocarbon resin in good yields.

The process used to graft the hydrocarbon resin with maleic anhydride proceeds smoothly at mild temperatures. Typically the resin is maleated at 130° C. to 250° C. using a peroxide such that the maleic anhydride will be grafted onto the resin in a reasonable time period. A chain transfer agent may be used if desired. By the appropriate choice of quantity of peroxide and maleic anhydride, it is possible to vary the acid number of the resin from less than 1 up to about 60 or more.

A suitable process for preparing the graft copolymers may be described as follows:

A 2-liter resin flask charged with Resin H-130 is fitted with a mechanical stirrer, heating mantle, and nitrogen inlet. A thermocouple extending into the Eastotac Resin H-130 is to control the reaction temperature at 165° C. by means of a Parr temperature controller. An addition funnel containing maleic anhydride in acetone, 2,5-dimethyl-5-di(t-butyl-peroxy)hexane (Lupersol 101), and tetralin is fitted onto the resin flask. A Dean-Stark tube and condensor is also attached to the flask. The flask is heated to 165° C. and maintained with stirring for 15 minutes at which point the maleic anhydride/peroxide solution is added dropwise. The addition of the solution takes 45 minutes. The mixture is stirred an additional 30 minutes. The nitrogen flow is increased to a rapid purge for an additional 30 minutes to remove any unreacted maleic anhydride and (tetralin, if used). The maleated resin is removed from the flask. It has a viscosity of 1,425 cp at 190° C. and an acid number of 14.4. The RBSP is 129° C. and the Gardner color is 10. (The starting resin has a viscosity of 1,325 cp at 190° C., a Gardner color of 6 and RBSP of 130° C.).

The process for preparing the graft copolymer may be varied according to the desired properties in the graft copolymers. For example, if the graft copolymer is to be used in certain inks and coatings where properties such as enhanced viscosity control, superior polymer carrier, and gloss enhancement are desired, acid numbers of about 2–5 are needed. For graft copolymers to be used as tackifier resins in hot-melt adhesives where properties such as increased specific adhesives and increased bond strenth are desired, acid numbers of about 2–18 are needed. Where acid numbers of 18 and over are desired, whereby the graft copolymer is emulsifiable and may be used in water-based adhesives, coatings, polishes, etc., a catalyst is required.

The required acid numbers are attained by choice of reaction temperature, whether a catalyst is used, etc. For example, maleation reactions at 300° C. produce a resin having an acid number of 9.5. Copolymerization without use of a catalyst may be carried out in batch processes to produce products having acid numbers up to about 10. In continuous copolymerization processes, it is desirable to use a catalyst where acid numbers of greater than 6 are needed.

Another method for preparing the graft copolymers of this invention does not require catalysts or chain transfer agents. Thermal maleation proceeds smoothly at temperatures of 235°–340° C. The grafting reaction proceeds by the well-known "Ene" reaction (see Alder & Brachel, Ann. 651 141, 1962, for example). A typical example of the thermal maleation of a polycyclic hydrocarbon resin in accordance with this invention is described as follows.

A 1-liter resin flask is charged with 500 grams of Eastotac H-130 resin, placed in a heating mantle, and heated to 280° C. under a nitrogen blanket. Temperature is regulated by a Parr temperature controller monitored by a thermocouple extending into the molten resin. The resin is stirred by means of a mechanical stirrer. When the temperature of the resin flask is at the desired temperature, a 1-gram portion of the maleic anhydride is added as a finely divided powder through a section of flexible hose with two Hoffman clamps serving as an addition port. The maleic anhydride is added in 1-gram portions until all 10 grams are added. At the conclusion of the addition, the flexible hose assembly is removed and a vigorous nitrogen purge is sent through the flask. This removes any unreacted maleic anhydride and other low boiling components. After 20 minutes of purging the resin, the resin is removed from the flask. Table I gives typical reaction conditions and product properties (see Examples 1–4 and Control Example 5).

The thermal maleation of Eastotac H-130 resin results in a resin of good color and acid number of up to 9.5. Maleations utilizing only 1 percent maleic anhydride give acid numbers of 2.6, 3.8, or 4.5 depending on whether the reaction temperature is 260° C., 280° C., or 300° C., respectively. Addition of 2 percent maleic anhydride to Eastotac H-130 resin at 300° C. results in a 9.5 acid number resin.

Preferably, the hot-melt adhesive according to this invention includes a suitable plasticizer. Plasticizers render the adhesive more flexible and allow it to wet the substrate better. Up to about 30%, preferably about 10–15%, based on the total composition weight, of the plasticizer may be used. Suitable plasticizers include paraffin oil, naphthenic oil, mixtures of paraffin and naphthenic oil, and low molecular weight polyterpenes.

Conventional additives such as stabilizers, antioxidants and colorants may be used in the adhesive compositions according to this invention.

The adhesive compositions may be prepared by putting the ingredients in a vessel and stirring in a conventional manner. The compositions may be applied to substrates in a conventional manner, such as application in the form of a molten bead or spraying.

The following examples are submitted for a better understanding of the invention.

EXAMPLES 1 THROUGH 5

A 2-liter resin flask charged with 600 grams Eastotac H-130 resin is fitted with a mechanical stirrer, heating mantle, and nitrogen inlet. A thermocouple extending into the resin is to control the reaction temperature at 165° C. by means of a Parr temperature controller. An addition funnel containing 12.0 grams of maleic anhydride in 100 mL of acetone and 3.4 grams of 2,5-dimethyl-5-di-(t-butylperoxy)hexane (Lupersol 101) is fitted onto the resin flask. A Dean-Stark tube and condensor is also attached to the flask. The flask is heated to 165° C. and maintained with stirring for 15 minutes at which point the maleic anhydride/peroxide solution is added dropwise. The addition of the solution takes 45 minutes. The mixture is stirred an additional 30 minutes. The nitrogen flow is increased to a rapid purge for an additional 30 minutes to remove the unreacted maleic anhydride. The maleated resin is removed from the flask. It has a viscosity of 1,475 cp at 190° C. and an acid number of 6.6. The RBSP is 129° C. and the color is Gardner 9 (Example 1). Other graft copolymers are shown in Examples 2–4. Example 5 (Control) illustrates the properties of Eastotac H-130 resin containing no graft copolymer.

EXAMPLES 6–9

An amorphous propylene-butene copolymer is blended in the melt with 17.2 percent maleated resin (6.5 acid number) as shown in Table II, Example 6. The similar blend containing Eastotac H-130 resin in place of maleated resin as a control is also shown in Table II, Example 7. The hot-melt adhesive containing maleated resin when applied to polyethylene film and bonded to a nonwoven fabric at an adhesive bead weight of 2.2 mg per inch has a peel strength of 431 grams versus 279 grams for the control. The frequency of zippering is only 2 percent compared to 48 percent for the control. The hot-melt adhesive containing the maleated resin is a dramatic improvement over conventional diaper asssembly adhesives.

An amorphous propylene-butene copolymer is blended with 25 percent maleated resin with a 5 acid number as shown in Example 8 in Table II. This hot-melt adhesive has a very high bond strength on polyethylene film bonded to a nonwoven fabric. The hot-melt adhesive containing maleated resin at all three adhesive bead weights gives higher peel strengths than the control hot-melt adhesive utilizing Eastotac H-130 resin as in Table II (Example 9). The frequency of zippering is also considerably lower (2 percent versus 40 percent) than for the control. Thus, Examples 6-9 show the superior bond strength of the hot-melt adhesive containing maleated tackifier resin when used to bond nonwovens to polyethylene film.

Examples 10 and 11 show the superior bond aging qualities of the hot-melt adhesive containing maleated resin. An amorphous propylene-butene copolymer is blended with 7.5 percent maleated resin (with a 6.5 acid number) and 8.0 percent Eastotac H-130 resin to give a hot-melt adhesive which is bonded to polyethylene film and nonwoven fabric for bond aging tests at 70° F. and 120° F. This blend is Example 10 in Table III. As shown in Table III the maleated resin containing hot-melt adhesive of Example 10 has equivalent bond strength to Example 11 initially and after one week at 70° F. but after two weeks at 70° F. the adhesive of Example 10 has the same good bond strength without any zippering while the adhesive of Example 11 failed. The maleated hot-melt adhesive retains its good bond strength after aging two weeks at 120° F. while the control failed at only one week of aging at 120° F.

The adhesive of Example 10 is aged at 350° F. for 100 hours in a forced draft oven. This thermal stability test gives an indication of the pot life of a hot-melt adhesive. The hot-melt adhesive containing maleated resin has an initial viscosity to 325° F. of 5,300 cp and a Gardner color of 2. After the 100 hours at 350° F. the hot-melt adhesive has a viscosity at 325° F. of 5,000 cp and a Gardner color 9. This is only a 6 percent decrease in viscosity. No char, skin, or gel was present in the adhesive.

TABLE I

Preparation of Maleated Hydrocarbon Resins

| | Example | | | | |
|---|---|---|---|---|---|
| | 1 | 2 | 3 | 4 | 5 (Control)** |
| Hydrocarbon Resin*, grams | 600 | 2,050 | 2,100 | 2,100 | |
| Maleic Anhydride, grams | 12 | 25 | 30 | 22 | |
| LUPERSOL 101 peroxide Catalyst | 3.4 | 7.2 | 8.7 | 6.6 | |
| Viscosity of product at 190° C., cp | 1,475 | 1,110 | 900 | 1,075 | 1,300 |
| Acid Number | 6.6 | 6.5 | 8.0 | 2.2 | 0 |
| RBSP, °C. | 129 | 127 | 126 | 127 | 130 |

TABLE I-continued

Preparation of Maleated Hydrocarbon Resins

| | Example | | | | |
|---|---|---|---|---|---|
| | 1 | 2 | 3 | 4 | 5 (Control)** |
| Gardner Color | 9 | 4 | 9 | 5 | 4 |

*Starting resin was Eastotac 130L.
**The control example is Eastotac H-130 resin containing no maleated graft copolymer.

TABLE II

Description and Performance of Hot Melt Adhesives Containing Maleated Eastotac H-130 Resin

| | Example | | | |
|---|---|---|---|---|
| | 6 | 7 (Control) | 8 | 9 (Control) |
| Base Polymer Type | P/B* | P/B | P/B | P/B |
| Viscosity of Base Polymer at 190° C., cp | 3,600 | 3,600 | 3,900 | 3,900 |
| Comonomer, % | 42 | 42 | 48 | 48 |
| RBSP, °C. | 102 | 102 | 96 | 96 |
| Tackifier Acid Number | 6.5 | 0 | 5.0 | 0 |
| Blend Composition, % | | | | |
| Base Polymer | 82.3 | 82.3 | 75.8 | 80 |
| Tackifier | 17.2 | 17.2 | 24.7 | 19.5 |
| Stabilizers | 0.5 | 0.5 | 0.5 | 0.5 |
| Viscosity at 325° F., cp | 5,620 | 5,680 | 6,120 | 6,300 |
| Softening Point, °C. | 96 | 96 | 93 | 93 |
| Bond Strength, grams | 431 | 279 | 790 | 660 |
| Zippering (length), % | 2 | 48 | 2 | 40 |
| Adhesive Bead Weight, mg/inch | 2.2 | 2.2 | 2.6 | 2.6 |
| Bond Strengths (PE to Nonwoven at Various Adhesive Bead Wt. grams | | | | |
| 2.06 Mg/Inch | — | — | 600 | 520 |
| 1.56 Mg/Inch | — | — | 520 | 240 |

*P/B = Propylene-Butene Copolymer

TABLE III

Aging Study of Hot Melt Adhesives Containing Blends of EASTOTAC H-130 Resin and Maleated Resin

| | Example | |
|---|---|---|
| | 10 | 11 (Control) |
| Base Copolymer | Propylene-Butene | Propylene-Butene |
| Viscosity at 190° C., cp | 3,600 | 3,600 |
| Comonomer, % | 42 | 42 |
| RBSP, °C. | 102 | 102 |
| Base Polymer, % | 82.5 | 82.5 |
| Maleated Resin (6 Acid Number), % | 8.5 | — |
| EASTOTAC 130 Resin, % | 8.5 | 17.0 |
| Stabilizers, % | 0.5 | 0.5 |
| Blend Viscosity at 325° F., cp | 4,950 | 4,900 |
| RBSP, °C. | 97 | 97 |
| Initial Bond Strength PE Film to Nonwoven | | |
| Initial, gram | 498 | 543 |
| Zippering, % | 0 | 6 |
| Aged 1 Week at 73° F., grams | 437 | 485 |
| Zippering, % | 0 | 26 |
| Aged 2 Weeks at | 527 | 288 |

TABLE III-continued

Aging Study of Hot Melt Adhesives Containing
Blends of EASTOTAC H-130 Resin and Maleated Resin

| | Example | |
|---|---|---|
| | 10 | 11 (Control) |
| 120° F., grams Zippering, % | 0 | 8 |
| Aged 1 Week at 120° F., grams | 479 | 0 |
| Zippering, % | 0 | 100 |
| Aged 2 Weeks at 120° F., grams | 483 | — |
| Zippering, % | 0 | — |

Adhesive bead weight was 2.0 mg/inch.

EXAMPLE 12

This example shows the improvement in bond strength and percent zippering in hot-melt adhesives based on amorphous polypropylene (rather than a copolymer of propylene) when maleated tackifier resins are used. A diaper construction adhesive consisting of 19.5 grams of maleated Eastotac 130 resin (4 acid number) and 80 percent amorphous polypropylene and 0.5 percent conventional stabilizers is prepared and tested on nonwoven to polyethylene film. The maleated resin-containing adhesive has a bond strength of 204 grams with 25 percent zippering. The identical blend containing Eastotac 130 resin in place of the maleated resin is also prepared and tested. This control blend has a bond strength of 150 grams with 42 percent zippering. The adhesive bead weight is 2.02 mg per inch in both cases.

Bond strength is measured by the controlled destruction of the bonds by an Instron tensile tester at 10 inches/min. The non-woven is pulled from the polyethylene in a T-peel mode.

Zippering is measured as percent of bond failure over the entire length of the bond.

Melt viscosities are determined on a Brookfield Model RTV Thermosel viscometer using a number 27 spindle (ASTM D-1824-66).

RBSP is determined by ASTM D-2398.

Acid number is determined by ASTM D-1386-59.

Gardner color is determined by ASTM method D-1544.

Unless otherwise specified, all proportions, ratios, percentages, etc., are by weight.

While the invention has been described in detail with particular reference to preferred embodiments thereof, it will be understood that variations and modifications can be effected within the spirit and scope of the invention.

We claim:
1. A hot-melt adhesive composition comprising
   (1) from about 55 to about 95 weight % of an amorphous polymer containing at least 30% propylene, and
   (2) from about 45 to about 5 weight % of a graft copolymer of
      (a) a saturated, polycyclic hydrocarbon resin having a viscosity of about 100–2000 cps at 190° C. and a ring and ball softening point of about 75°–150° C., and
      (b) maleic anhydride, said graft copolymer having an acid number of about 0.5–60.
2. A hot-melt adhesive composition according to claim 1 wherein said amorphous polymer is a copolymer of propylene and butene.
3. A hot-melt adhesive composition according to claim 1 wherein said graft copolymer has an acid number of about 1.0–42.
4. A hot-melt adhesive composition according to claim 1 wherein said graft copolymer of polycyclic hydrocarbon resin has a viscosity of about 150–1000 cps at 190° C., an acid number of greater than 0.1 and a ring and ball softening point of about 90°–130° C.
5. A hot-melt adhesive according to claim 1 wherein the amorphous polymer is a copolymer containing up to 70% of at least one α-olefin other than propylene having 2–6 carbon atoms.

* * * * *